Oct. 7, 1947.                G. A. ANDERSON                2,428,350
                          MILKING MACHINE CLAW
                          Filed March 12, 1945
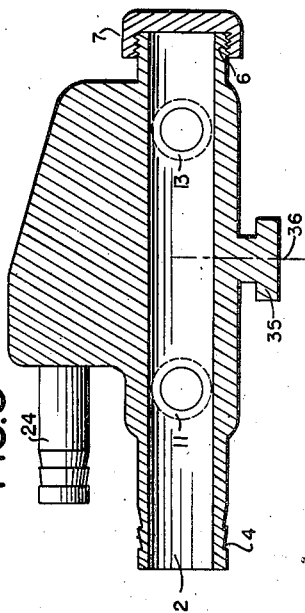
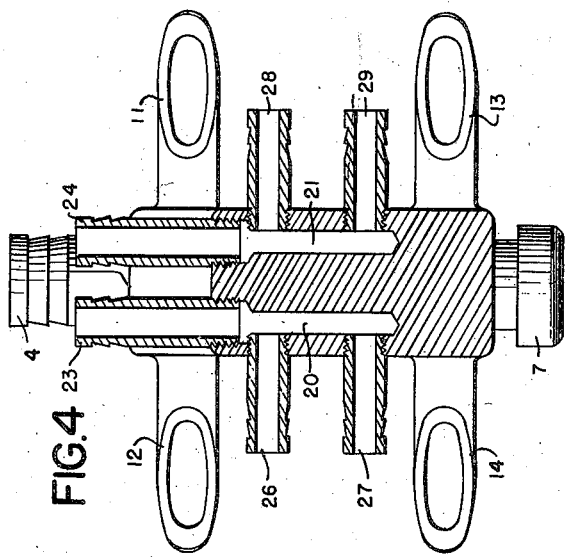
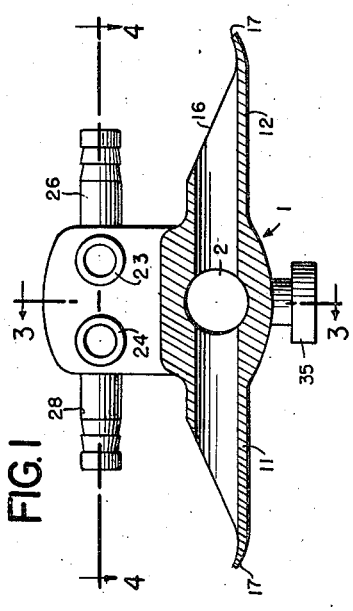
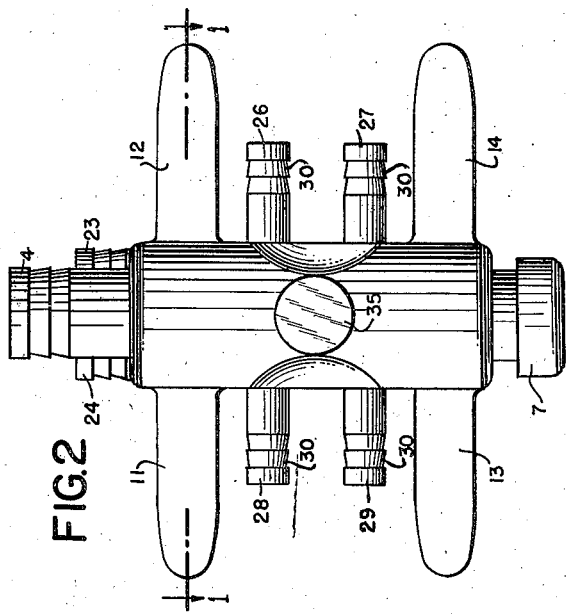
*INVENTOR.*
GUSTAVE A. ANDERSON
BY *Morris Spector*
                    ATTORNEY Patented Oct. 7, 1947

2,428,350

UNITED STATES PATENT OFFICE 2,428,350

MILKING MACHINE CLAW

Gustave A. Anderson, Chicago, Ill.

Application March 12, 1945, Serial No. 582,226

5 Claims. (Cl. 31—83)

This invention relates to milking machine claws, particularly to a claw for a milking machine of the pulsator type.

A milking machine claw is a manifold device which connects the teat cups with the milk discharge passageways and which connects the vacuum pipes of the teat cup inflations to the proper chambers for receiving alternate vacuum and pressure.

It is one of the objects of the present invention to provide a claw which is simple and economical of construction and wherein the milk passageways are so arranged that they can easily be kept clean. This is attained, in the preferred embodiment of the present invention, by making the milk nipples of the claw in the form of straight aligned passageways which are an integral part of the structure which includes the main milk passageway. Because the milk passageways are straight it is easy to insert a cleaning brush into and through the passageways to clean the same. Because the milk hose receiving nipples are an integral part of the casting structure that includes the main milk passageway, there are no crevices or fissures at the juncture between the milk line nipples and the main milk passageway within the claw. This very greatly simplifies the operation of maintaining the milk passageways in the claw in a clean and sanitary condition.

It is a further object of the present invention to provide a milk claw of the above mentioned character wherein the center of gravity of the structure is substantially midway between the nipples that receive the hose extending to the inflations so that the weight of the claw is uniformly distributed between the four inflations connected with the claw. As a result, the weight of the claw is uniformly distributed between the four teats.

The attainment of the above and further objects of the present invention will be apparent from the following specification taken in conjunction with the accompanying drawing forming a part thereof.

In the drawing:

Figure 1 is a transverse sectional view through a claw embodying the present invention, said view being taken along the line 1—1 of Figure 2 and looking in the direction of the arrows;

Figure 2 is a bottom view of the milk claw of the present invention;

Figure 3 is a sectional view taken along the line 3—3 of Figure 1 and looking in the direction of the arrows; and Figure 4 is a section taken along the line 4—4 of Figure 1 and looking in the direction of the arrows.

Reference may now be had more particularly to the drawings wherein like reference numerals designate like parts throughout. The claw is indicated in general by the reference numeral 1 and comprises a cast metal body, preferably a bronze casting, having a central straight longitudinal bore or main milk passageway 2 extending therethrough. This passageway is open at both ends and is made straight so that a cleaning brush may be moved therethrough to clean the same. From the main body of the casting there extends a tubular main milk line nipple 4 which is cast as an integral part of the main body and is adapted to receive a hose which is slipped over the end of the nipple 4 and connects the main milk passageway 2 with a milk receiving container. The opposite or rear end of the main milk passageway 2 is externally threaded, as indicated at 6, to receive an internally threaded metal closure cap 7 which closes and seals the rear end of the main milk passageway but is removable for cleaning purposes.

The body of the claw has four similar circular milk line nipples 11, 12, 13 and 14 extending therefrom, said nipples being part of the casting of the main body of the claw and cast as an integral unit therewith. The nipples 11—12 are in line with one another, and the nipples 13—14 are in line with one another, as may be seen from Figures 1 and 2. The longitudinal axes of the four nipples 11—14 and the longitudinal axis of the main milk passageway 2 are all in the same horizontal plane. The nipples 11—14 are each adapted to receive a rubber or other flexible hose which fits on the outside of the nipple and extends to the inflation that is fitted over the cow's teat. The end of each nipple 11 through 14 is at an angle of approximately 25° to the horizontal, as indicated at 16, and the lower end of each nipple has an upwardly turned lip or upward crimp 17. The lip 17 comes into use when and if the hose which is fitted around the outside of the nipple and extends to the inflation is allowed to drop or hang downwardly from the nipple. At that time the lip or crimp 17 on each nipple effects a closure with the inner side of the suspended rubber tube so as to prevent the movement of air through the tube into the claw. The four nipples 11—14 are uniformly spaced on opposite sides of the longitudinal axis of the main milk passageway 2.

Above and on opposite sides of the main milk passageway 2 the claw has two incommunicable straight bores 20 and 21 whose longitudinal axes are parallel with the longitudinal axis of the bore of the main milk passageway 2. The bores 20 and 21 have air nipples 23 and 24 communicating therewith, said nipples being threaded into the body of the claw and soldered in place by a soft solder. The air nipples 23 and 24 connect with a milking machine pulsator by means of rubber hose slipped over the ends of the nipples, as is known in the art, for receiving, alternately, vacuum and atmospheric pressure. In addition, the bore 20 has two air nipples 26 and 27 communicating therewith said nipples being threaded into the main body of the claw and soldered in place. Likewise the bore 21 has two nipples 28 and 29 communicating therewith, said nipples being also threaded into the body of the claw and soldered in place. The longitudinal axes of the four nipples 26 through 29 and of the bores 20 and 21 and of the nipples 23 and 24 all lie in the same horizontal plane. The nipples 26—28 are in alignment and the nipples 27—29 are in alignment. The four nipples 26—29 are equally spaced from the center line between the milk line nipples 11—12 and 13—14.

Each of the air line nipples 23—24 and 26—29 and the nipple 4 is adapted to have rubber hoses slipped over their ends. To facilitate holding of the stretched rubber hose which extends around these nipples each of them has enlarged rings 30—30 tapered in one direction so as to tend to hold in place a rubber hose which has been slipped over the end of the nipple.

At the bottom of the claw there is formed a knob 35 which is an integral part of the casting constituting the claw. The knob is of a circular shape and is provided for the purpose of permitting hanging of the claw over a notch formed in the bale of the milk container or milking unit. The longitudinal axis of the knob is at right angles to the plane determined by the longitudinal axes of the nipples 11—14 and of the nipples 26—29 and passes midway between the nipples of each of the above mentioned set of nipples. The center of gravity of the claw is located in line with the longitudinal axis of the knob 35, that is, the knob is located so that its longitudinal axis 36 passes through the center of gravity of the claw. This produces a balanced arrangement of the structure. As a result of the symmetrical location of parts with reference to the nipples that extend to the inflations, the pull due to the weight of the claw is uniformly distributed on the four teats of the cow.

In compliance with the requirements of the patent statutes I have here shown and described a preferred embodiment of my invention. It is, however, to be understood that the invention is not limited to the precise construction here shown, the same being merely illustrative of the principles of the invention. What is considered new and desired to be secured by Letters Patent is:

1. A milking machine claw comprising a unitary casting having a main milk passageway extending lengthwise through the casting and open at both ends to facilitate cleaning thereof, the casting having external screw threads at one end of the main milk passageway and a closure cap threaded on said threads and closing said passageway, the interior of the milk passageway being smooth and the threads being on the outside to facilitate maintenance of a clean condition of said main milk passageway, said passageway having two milk inlet nipples extending therefrom on one side of the longitudinal axis of the passageway and two more milk inlet nipples extending therefrom on the other side of the longitudinal axis and in line with the respective ones of the first mentioned nipples, the nipples being an integral part of the casting so that the juncture of the bores of the nipples with the bore of the main milk passageway is free of all crevices, thereby facilitating the maintenance of a clean condition.

2. A milking machine claw comprising a unitary casting having three straight incommunicable bores therein, one bore comprising a main milk passageway extending lengthwise through the casting and open at both ends to facilitate cleaning thereof, the casting having external screw threads at one end of the main milk passageway and a closure cap threaded on said threads and closing said passageway, the interior of the milk passageway being smooth and the threads being on the outside to facilitate maintenance of a clean condition of said main milk passageway, said passageway having two milk inlet nipples extending therefrom on one side of the longitudinal axis of the passageway and two more milk inlet nipples extending therefrom on the other side of the longitudinal axis and in line with the respective ones of the first mentioned nipples, the nipples being an integral part of the casting so that the juncture of the bores of the nipples with the bore of the main milk passageway is free of all crevices, thereby facilitating the maintenance of a clean condition, the longitudinal axes of said nipples and of said passageway all lying in one common plane with the longitudinal axes of the nipples at right angles to the longitudinal axes of the main milk passageway, said two other bores being parallel to the main milk passageway and each of said last mentioned bores having two air nipples extending therefrom.

3. A milking machine claw comprising a unitary casting having three straight incommunicable bores therein, one bore comprising a main milk passageway extending lengthwise through the casting and open at both ends to facilitate cleaning thereof, the casting having external screw threads at one end of the main milk passageway and a closure cap threaded on said threads and closing said passageway, the interior of the milk passageway being smooth and the threads being on the outside to facilitate maintenance of a clean condition of said main milk passageway, said passageway having two milk inlet nipples extending therefrom on one side of the longitudinal axis of the passageway and two more milk inlet nipples extending therefrom on the other side of the longitudinal axis and in line with the respective ones of the first mentioned nipples, the nipples being an integral part of the casting so that the juncture of the bores of the nipples with the bore of the main milk passageway is free of all crevices, thereby facilitating the maintenance of a clean condition, the longitudinal axes of said nipples and of said passageway all lying in one common plane with the longitudinal axes of the nipples at right angles to the longitudinal axis of the main milk passageway, said two other bores being parallel to the main milk passageway and each of said last mentioned bores having two air nipples extending therefrom, the longitudinal axes of the nipples from the two last mentioned bores all being equally spaced on opposite sides of a plane which is at right angles to said first mentioned plane and intersects it along the longitudinal axis of said main milk passageway, the four air nipples being between the four milk inlet nipples.

4. A milking machine claw comprising a unitary casting having three straight incommunicable bores therein, one bore comprising a main milk passageway extending lengthwise through the casting and open at both ends to facilitate cleaning thereof, the casting having external screw threads at one end of the main milk passageway and a closure cap threaded on said threads and closing said passageway, the interior of the milk passageway being smooth and the threads being on the outside to facilitate maintenance of a clean condition of said main milk passageway, said passageway having two milk inlet nipples extending therefrom on one side of the longitudinal axis of the passageway and two more milk inlet nipples extending therefrom on the other side of the longitudinal axis and in line with the respective ones of the first mentioned nipples, the nipples being an integral part of the casting so that the juncture of the bores of the nipples with the bore of the main milk passageway is free of all crevises, thereby facilitating the maintenance of a clean condition, the longitudinal axes of said nipples and of said passageway all lying in one common plane with the longitudinal axes of the nipples at right angles to the longitudinal axis of the main milk passageway, said two other bores being parallel to the main milk passageway and each of said last mentioned bores having two air nipples extending therefrom, the longitudinal axes of the nipples from the two last mentioned bores all being equally spaced on opposite sides of a plane which is at right angles to said first mentioned plane and intersects it along the longitudinal axis of said main milk passageway, the four air nipples being between the four milk inlet nipples, and a hang up knob constituting an integral part of the casting and having a longitudinal axis at right angles to the plane of the axes of the air nipples and midway between the axes of the air nipples.

5. A milking machine claw comprising a unitary casting having three straight incommunicable bores therein, one bore comprising a main milk passageway extending lengthwise through casting and open at both ends to facilitate cleaning thereof, said passageway having two milk inlet nipples extending therefrom on one side of the longitudinal axis of the passageway and two more milk inlet nipples extending therefrom on the other side of the longitudinal axis and in line with the respective ones of the first mentioned nipples, the nipples being an integral part of the casting so that the juncture of the bores of the nipples with the bore of the main milk passageway is free of all crevices, thereby facilitating the maintenance of a clean condition, said two other bores being parallel to the main milk passageway and each having two air nipples extending therefrom, the longitudinal axes of the nipples from the two last mentioned bores being equally spaced on opposite sides of a vertical plane through the longitudinal axis of said main milk passageway, the four air nipples being between the four milk inlet nipples, and a hang up knob constituting an integral part of the casting and having a longitudinal axis located midway between the axes of the air nipples.

G. A. ANDERSON.

REFERENCES CITED

The following references are of record in the file of this patent:

UNITED STATES PATENTS

| Number | Name | Date |
|---|---|---|
| D. 142,510 | Anderson | Oct. 9, 1945 |
| D. 142,766 | Anderson | Nov. 6, 1945 |
| 2,290,239 | Hodsdon | July 21, 1942 |
| 1,479,014 | Stampen | Jan. 1, 1924 |

FOREIGN PATENTS

| Number | Country | Date |
|---|---|---|
| 335,655 | England | Oct. 2, 1930 |